(No Model.)
A. D. MOULTON.
BICYCLE STAND.
No. 516,571. Patented Mar. 13, 1894.
Fig. 1.
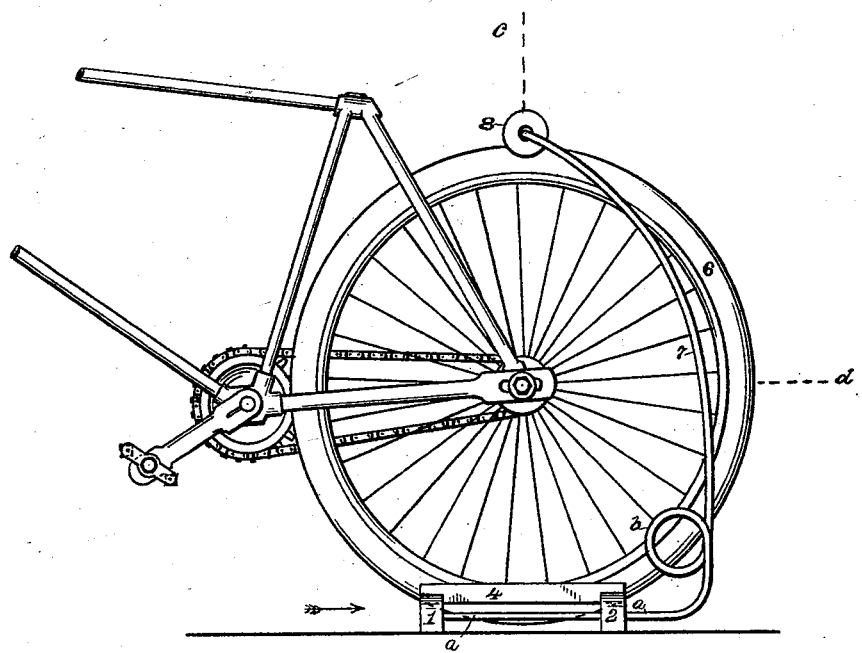
Fig. 3.
Fig. 2.
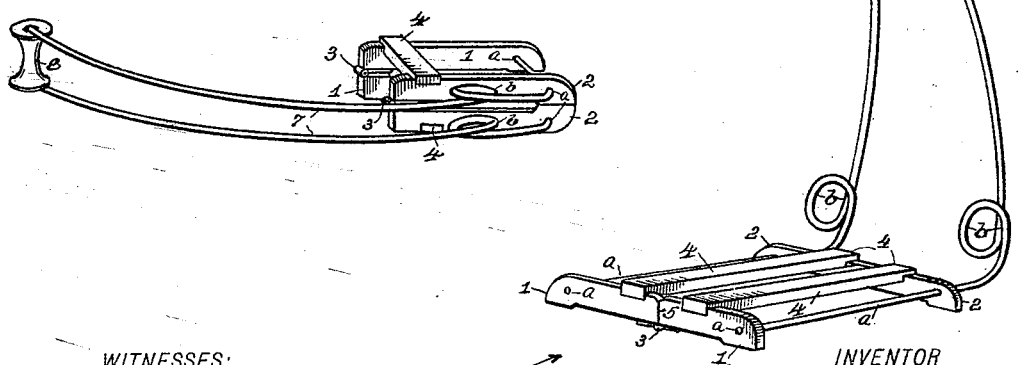
WITNESSES:
C. M. Newman
H. R. Frisbie
INVENTOR
Alvin D. Moulton
BY
Geo. D. Phillips
his ATTORNEY

UNITED STATES PATENT OFFICE.

ALVIN D. MOULTON, OF BRIDGEPORT, CONNECTICUT.

BICYCLE-STAND.

SPECIFICATION forming part of Letters Patent No. 516,571, dated March 13, 1894.

Application filed November 28, 1893. Serial No. 492,201. (No model.)

*To all whom it may concern:*

Be it known that I, ALVIN D. MOULTON, a citizen of the United States, and a resident of Bridgeport, in the county of Fairfield and State of Connecticut, have invented certain new and useful Improvements in Bicycle-Stands, of which the following is a specification.

My invention relates to an improvement in bicycle stands, and consists in a base piece or platform having a resilient spring support projecting upward therefrom, which will automatically adjust itself to wheels of varying diameters; which support, in connection with the base or platform, will maintain the bicycle in an upright position. This base or platform is so constructed that it can be folded together so as to occupy but little space when not in use, or in transportation.

To enable others skilled in the use of such devices to readily understand my construction, reference is had to the accompanying drawings in which—

Figure 1 represents a side elevation of my improved bicycle stand with a wheel locked therein; also broken section of the bicycle frame attached to said wheel. Fig. 2 is a perspective view of the stand in operative position to receive the wheel of the bicycle. Fig. 3 represents the platform of the supporting stand folded so that the whole structure will occupy but little space.

Its construction and operation are as follows: 1 and 2 are the supporting feet of the platform centrally divided and connected together by the hinges 3. Cross-pieces or cleats 4 connect the said feet together and such cleats are arranged, as shown, on each side of the dividing line 5, Fig. 2, and a sufficient distance apart so as to allow the tire 6 and the felly of the wheel to pass between them, as shown in Fig. 1, said tire resting on the inner corners of the feet 1 and 2 and between the same. As all that is required of the cleats 4 is simply to guide the wheel on to the platform and prevent its slipping sidewise while there; grooves or notches in the supporting feet 1 and 2 would answer equally as well. The arms 7 of the spring support are preferably made of one single piece of spring wire, its two free ends $a\,a$ passing through the ends of the feet 1 and 2, as shown, and provided a short distance above the platform with the coils or turns $b\,b$ which increases the springing tendency of said arms. In the upper bend of these arms is loosely mounted the roller 8.

To operate the device, the wheel is simply rolled over the foot 1 (see arrow) when it will drop from its own weight into the opening between the cleats 4. In the meantime the upper surface of the wheel will engage the roller 8 and thereby force the spring support back for this purpose. As the normal position of the roller 8 is central or nearly so with the center of the base or platform, it is evident that the resilient action of the support will exert a downward pressure on the wheel, which combined with its firm hold in the broad base or platform will maintain the bicycle in an upright position. This device is adapted for wheels of different diameters so that, if the height or distance of the roller 8 from the platform is sufficient to accommodate the smallest wheel in the market, and forcibly rest upon the central portion of the same, as shown in Fig. 1, any increase in the size of the wheels would simply bring said roller into engagement with the periphery somewhere between the vertical and horizontal lines $c\,d$ (see dotted position of said roller) and exert a firm grip in any of the positions it might occupy between these two points. When not in use the base or platform is folded together, as shown in Fig. 3, which operation also brings the arms 7 of the spring support into a space no wider than the folded sections of the platform. The coils $b$ of the arms 7 may, if desired, be dispensed with, although they assist very materially in stiffening the said arms when made of small wire, in which case the said coils will be most effective the nearer they are placed to the platform. In some cases also, if desired, one of the resilient arms may be dispensed with and the remaining one made stiff enough to answer the purpose.

In a very cheap construction the hinges 3 may be dispensed with and each of the legs 1 and 2 made of one piece instead of two.

Having thus described my invention, what I claim as new, and desire to secure by Letters Patent, is—

1. In a bicycle-supporting stand, comprising in combination, a base or platform upon which the wheel is adapted to rest, side supports therefor on said platform, resilient spring support attached thereto and overhanging the said wheel and arranged to engage therewith when the wheel is rolled upon the platform and, by means of its spring tension, hold it firmly thereto.

2. The combination in a bicycle-stand, of the feet 1 and 2 hinged together, as shown, side supporting cleats 4, spring supporting arms 7, having coils $b$ therein, roller 8 to engage the wheel, all arranged substantially as shown and described.

Signed at Bridgeport, in the county of Fairfield and State of Connecticut, this 20th day of November, A. D. 1893.

ALVIN D. MOULTON.

Witnesses:
 HENRY C. EVANS,
 L. M. SLADE.